(12) United States Patent
Lim (10) Patent No.: US 12,326,516 B2
(45) Date of Patent: Jun. 10, 2025

(54) PULSE COMPRESSED RADAR SIGNAL DETECTION METHOD

(71) Applicant: PUKYONG NATIONAL UNIVERSITY INDUSTRY-UNIVERSITY COOPERATION FOUNDATION, Busan (KR)

(72) Inventor: Chang Heon Lim, Busan (KR)

(73) Assignee: PUKYONG NATIONAL UNIVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 407 days.

(21) Appl. No.: 18/058,672

(22) Filed: Nov. 23, 2022

(65) Prior Publication Data

US 2023/0168338 A1    Jun. 1, 2023

(30) Foreign Application Priority Data

Dec. 1, 2021    (KR) .................. 10-2021-0169990

(51) Int. Cl.
*G01S 7/292*    (2006.01)
(52) U.S. Cl.
CPC .................. *G01S 7/292* (2013.01)
(58) Field of Classification Search
CPC ......... G01S 7/292; G01S 13/75; G01S 13/124
USPC ............... 342/173, 195, 368, 372
See application file for complete search history.

(56) References Cited

U.S. PATENT DOCUMENTS

| 2016/0226570 A1* | 8/2016 | Nicholls | H04B 7/0897 |
| 2017/0097413 A1* | 4/2017 | Gillian | G01S 7/4004 |
| 2018/0074206 A1* | 3/2018 | Niesen | G01S 19/22 |

FOREIGN PATENT DOCUMENTS

| KR | 10-0966289 B1 | 6/2010 |
| KR | 10-2018-0013485 A | 2/2018 |
| KR | 10-2021-0013999 A | 2/2021 |
| KR | 10-2296923 B1 | 9/2021 |

OTHER PUBLICATIONS

Office Action for KR 10-2021-0169990 by Korean Intellectual Property Office dated Jan. 17, 2024.
Park, Jongbu et al. "Multiple Detections Based Spectrum Sensing Method for Radar Bands" The Journal of Korean Institute of Electromagnetic Engineering and Science. Nov. 2020.
Notice of Allowance for KR 10-2021-0169990 by Korean Intellectual Property Office dated Jul. 5, 2024.

(Continued)

*Primary Examiner* — Bo Fan
(74) *Attorney, Agent, or Firm* — BROADVIEW IP LAW, PC (57) ABSTRACT

The present disclosure relates to a pulse compressed radar signal detection method. The aspect of the present disclosure is to provide a radar signal detection method based on a generalized likelihood ratio test (GLRT) for detecting a pulse compressed radar signal by adequately utilizing the repeatability of pulses and being applicable even to a non-pulse compressed radar signal, thus having a relatively wide application range and securing excellent detection performance.

7 Claims, 6 Drawing Sheets

(56) References Cited

OTHER PUBLICATIONS

Lim, Chang Heon. "A Generalized Likelihood Ratio Test Based Spectrum Sensing Technique for Cognitive Radio in Radar Bands." Research Paper. The Journal of Korean Institute of Communications and Information Sciences 18-11 vol. 43 No. 11. <https://doi.org/10.7840/kics.2018.43.11.1802> Oct. 22, 2018.

Lim, Chang Heon et al. "GLRT-Based Spectrum Sensing Techniques for Pulse Radar Signals." IEEE Communications Letters, vol. 24, No. 2, Feb. 2020.

Chang-Ho Nam et al. "Approximated Modeling Technique of Weibull Distributed Radar Clutter." Journal. The Journal of Korean Institute of Electromagnetic Engineering and Science. Jul. 2012; 23(7), 822~830. <http://dx.doi.org/10.5515/KJKIEES.2012.23.7.822> Jun. 15, 2012.

\* cited by examiner

PULSE COMPRESSED RADAR SIGNAL DETECTION METHOD

CROSS-REFERENCE TO RELATED APPLICATION(S)

This application is based on and claims priority under 35 U.S.C. 119 to Korean Patent Application No. 10-2021-0169990, filed on Dec. 1, 2021, in the Korean Intellectual Property Office, the disclosure of which is herein incorporated by reference in its entirety.

BACKGROUND OF THE INVENTION

1. Field of the Invention

The present disclosure relates to a radar signal detection method and, more particularly, to a radar signal detection method based on a generalized likelihood ratio test (GLRT) for detecting a pulse compressed radar signal.

2. Description of the Prior Art

A frequency band in which radar has priority has a wide bandwidth but is known to have a low utilization rate. For a secondary user to opportunistically use a radar band, the secondary user first needs to determine whether a radar signal exists in the band.

To this end, the secondary user periodically analyzes a received signal and determines whether there is a radar signal. Here, signals within an observation time may be divided into only two types, which are a received pulse radar signal and noise, depending on existence of a radar signal. In particular, when there is a pulse radar signal, a plurality of radar pulses are in a form of periodically appearing within the observation time. When pulse compression is employed in pulse radar, a radar pulse does not have a rectangular shape any longer, but has various shapes depending on a pulse compression method. Most conventional radar signal detection techniques determine existence of a pulse on the basis of a power level or a power change, and do not adequately utilize pulse compression and repeatability of pulses.

RELATED DOCUMENT

Non-Patent Document

1. Chang Heon Lim, "A Generalized Likelihood Ratio Test Based Spectrum Sensing Technique for Cognitive Radio in Radar Bands", Journal of Korea Information and Communications Society, Vol. 43, No. 11, pp. 1802-1804, 2018.
2. C. H. Lim and D. A. Guimaryes, "GLRT-Based Spectrum Sensing Techniques for Pulse Radar Signals," IEEE Communications Letters, Vol. 24, No. 2, pp. 447-450, February 2020.

SUMMARY OF THE INVENTION

The present disclosure has been made in order to solve the above-mentioned problems, and an aspect of the present disclosure is to provide a radar signal detection method based on a generalized likelihood ratio test (GLRT) for detecting a pulse compressed radar signal by adequately utilizing the repeatability of pulses and being applicable even to a non-pulse compressed radar signal, thus having a relatively wide application range and securing excellent detection performance.

According to a summary of features of the present disclosure, a radar signal detection method by a detection device according to an embodiment of the present disclosure for achieving the foregoing aspect may include: sampling signal sample values $\{r(n), (n=0, 1, \ldots, N-1)\}$ in each observation window by receiving an RF signal and performing signal sampling at each time (n); calculating a signal estimation value $\hat{p}(n)$ at each time (n) with respect to the signal sample values $r(n)$; calculating a first maximum likelihood estimation value $\hat{\sigma}_{w,0}^2$ of noise power when no radar pulse exists in the observation window of $r(n)$ and a second maximum likelihood estimation value $\hat{\sigma}_{w,1}^2$ of noise power when the radar pulse exists in the observation window of $r(n)$; and determining whether a radar pulse exists in the observation window by calculating a test statistic $\Gamma$ in each observation window by using $\hat{\sigma}_{w,0}^2$ and $\hat{\sigma}_{w,1}^2$ and comparing the test statistic $\Gamma$ with a detection threshold value.

The determining whether the radar pulse exists in the observation window may include generating a final estimation value for a time $(n_0)$ at which the radar pulse of a pulse radar signal starts and a time $(n_1-1)$ at which the radar pulse of the pulse radar signal ends when one or more radar pulses exist in the pulse radar signal.

The radar signal detection method may further include determining whether a radar signal exists in a plurality of observation window by comparing a total test statistic obtained by adding test statistics $(\Gamma_1, \Gamma_2, \ldots, \Gamma_n)$ in the respective observation windows during the n (natural number) observation windows with a predetermined period with the detection threshold value.

The radar signal detection method may further include determining whether a radar signal exists in a plurality of observation window according to whether a predetermined number k or more of test statistics among test statistics $(\Gamma_1, \Gamma_2, \ldots, \Gamma_n)$ in the respective observation windows during the n (natural number) observation windows with a predetermined period is greater than the detection threshold value.

The signal estimation value $\hat{p}(n)$ is calculated by the following equation:

$$\hat{p}(n) = \begin{cases} \dfrac{1}{L-1}\sum_{l=0}^{L} r(n+lM) & n_0 \le n < n_0 + K \\ \dfrac{1}{L}\sum_{l=0}^{L-1} r(n+lM) & n_0 + K \le n < n_0 + M \end{cases}$$

when L is 1 or greater, and is calculated by the following equation:

$$\hat{p}(n) = r(n) \quad n_0 \le n < n_0 + K$$

when L is 0, where $n_0$ denotes a time when the radar pulse of the pulse radar signal starts, $(n_1-1)$ denotes a time when the radar pulse of the pulse radar signal ends, $$L = \left\lfloor \frac{n_1 - n_0}{M} \right\rfloor, \quad K = n_1 - n_0 - LM,$$

and $\lfloor x \rfloor$ denotes a maximum integer not exceeding x, and M denotes the period of a radar signal pulse.

The first maximum likelihood estimation value $\hat{\sigma}_{w,0}^2$ and the second maximum likelihood estimation value are $\hat{\sigma}_{w,1}^2$ calculated by the following equations:

$$\hat{\sigma}_{w,0}^2 = \frac{1}{N}\sum_{n=0}^{N-1}|r(n)|^2$$

$$\hat{\sigma}_{w,1}^2 = \frac{1}{N}\left\{\sum_{n=0}^{n_0-1}|r(n)|^2 + \sum_{n=n_0}^{n_1-1}|r(n) - \hat{p}(n)|^2 + \sum_{n=n_1}^{N-1}|r(n)|^2\right\}$$

where $n_0$ denotes a time when the radar pulse of the pulse radar signal starts, and ($n_1-1$) denotes a time when the radar pulse of the pulse radar signal ends.

The test statistic $\Gamma$ is calculated by the following equation:

$$\Gamma = \max_{n_0, n_1}\left(\frac{\hat{\sigma}_{w,0}^2}{\hat{\sigma}_{w,1}^2}\right)^N,$$

where $n_0$ denotes a time when the radar pulse of the pulse radar signal starts, and ($n_1-1$) denotes a time when the radar pulse of the pulse radar signal ends.

A radar signal detection method according to the present disclosure may detect a pulse compressed radar signal on the basis of a generalized likelihood ratio test (GLRT) by adequately utilizing the repeatability of pulses, and may be applied even to a non-pulse compressed radar signal, thus having a relatively wide application range and achieving excellent detection performance.

BRIEF DESCRIPTION OF THE DRAWINGS

The accompanying drawings, which are included as a part of the detailed description to help the understanding of the present disclosure, provide embodiments of the present disclosure and explain the technical spirit of the present disclosure together with the detailed description.

DETAILED DESCRIPTION OF THE EXEMPLARY EMBODIMENTS

Hereinafter, the present disclosure will be described in detail with reference to the accompanying drawings. In the drawings, like reference numerals denote like components if possible. In addition, a detailed description of already known functions and/or configurations will be omitted. Details disclosed below will focus on parts necessary to understand operations according to various embodiments, and a description of elements that may obscure the gist of the description will be omitted. In addition, some components of the drawings may be exaggerated, omitted, or schematically illustrated. The size of each component does not entirely reflect the actual size, and therefore the details stated herein are not limited by the relative size or spacing of components drawn in each drawing.

When a detailed description about known technology related to the present disclosure is determined to make the gist of the present disclosure unclear in describing embodiments of the present disclosure, the detailed description will be omitted herein. The following terms are defined in view of functions in the present disclosure, and may be changed depending on a user, the intent of an operator, or the custom. Accordingly, the terms should be defined on the basis of the following overall description of this specification. The terms used in the detailed description are merely for describing the embodiments of the present disclosure, and should not be construed as being limited. Unless clearly specified otherwise, singular forms may include plural forms. In this description, the expression "including" or "comprising" is intended to indicate certain features, numbers, steps, operations, elements, or some or a combination thereof, and should not be construed to exclude the presence or possibility of one or more features, numbers, steps, operations, elements, or some or a combination thereof other than the aforementioned.

In addition, the terms "first", "second", and the like may be used to describe various components, but the components are not limited by these terms. The terms are used only to distinguish one component from another component.

Figure 1:
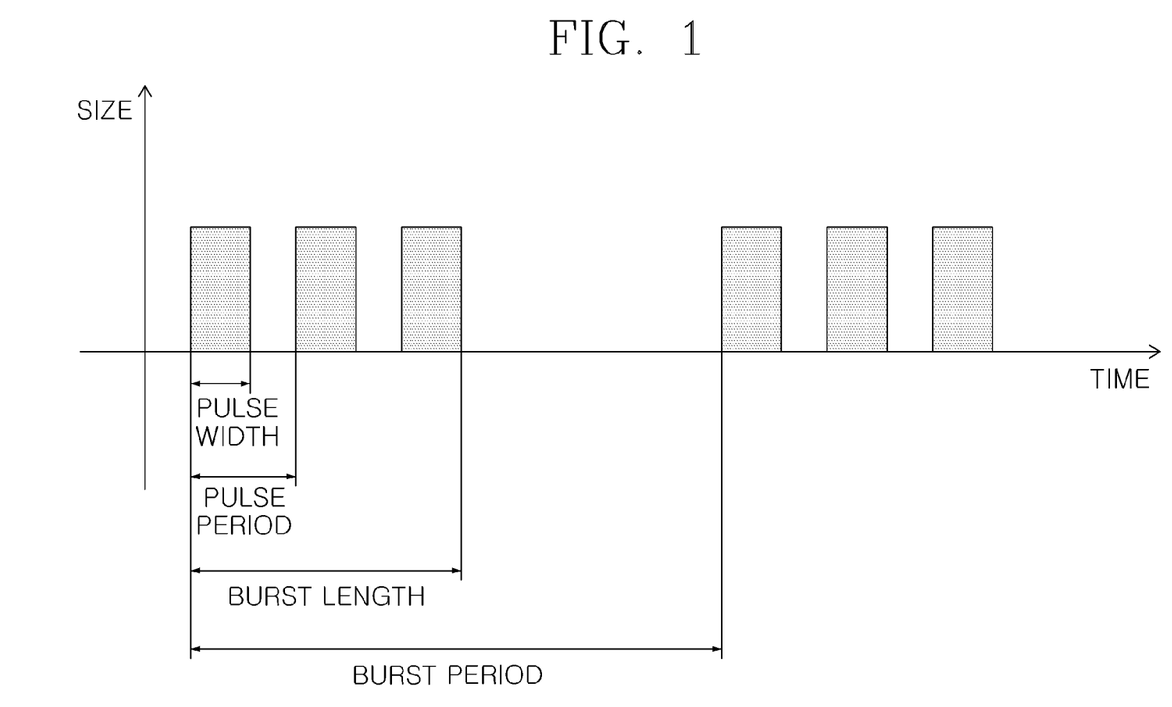
FIG. 1 illustrates one form of a general pulse radar signal.

FIG. 1 illustrates one form of a general pulse radar signal.

Since a radar transmitter repeatedly performs a form of transmitting a periodic pulse in a given direction and then transmitting a periodic pulse by changing an azimuth direction, a radar signal transmitted in a specific direction is expressed in time domain as shown in FIG. 1. A group of pulses appearing at an interval of a series of pulse periods in FIG. 1 is referred to as a burst. In search radar or the like, since the radar transmitter operates in a form of periodically making one rotation of a 360-degree azimuth, a burst also periodically appears, and a burst period is identical to a rotation period in the azimuth direction of a radar transmission antenna.

It is important for a secondary user (device or system) to opportunistically access a radar band to determine whether a pulse radar signal exists, which is called a spectrum sensing function. When no radar signal is found to exist, the secondary user may temporarily use the band, thus increasing the utilization rate of the band.

For spectrum sensing of a radar signal, the secondary user periodically determines whether a radar signal exists on the basis of a signal received at a predetermined time. When defining a case where a pulse radar signal exists within a radar signal observation window and a case where no pulse radar signal exists within the radar signal observation window as hypothesis $H_1$ and hypothesis $H_0$, respectively, a n-th received signal r(n) includes only noise in the case of hypothesis $H_0$, while r(n) is a signal of a received radar pulse plus noise when hypothesis $H_1$ is valid. N samples corresponding to the observation window (length of time) N (N is an integer equal to or greater than 2) of a received radar signal may be represented by {r(n), (n=0, 1, 2, . . . , N−1)} (n is 0 and an integer equal to or greater than 1).

Figure 2A:
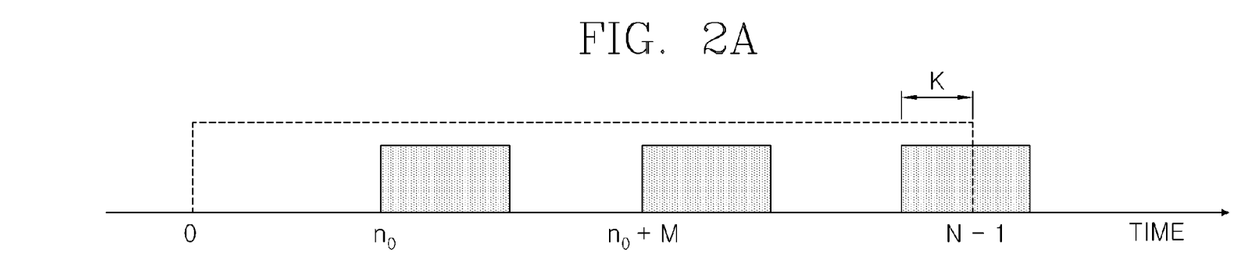
FIGS. 2A, 2B, and 2C illustrate examples of three radar signal reception situations that may occur within an observation window.
Figure 2B:
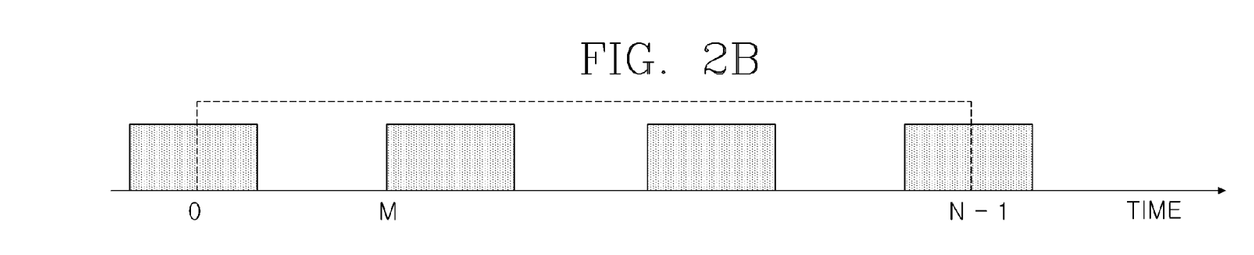
Figure 2C:
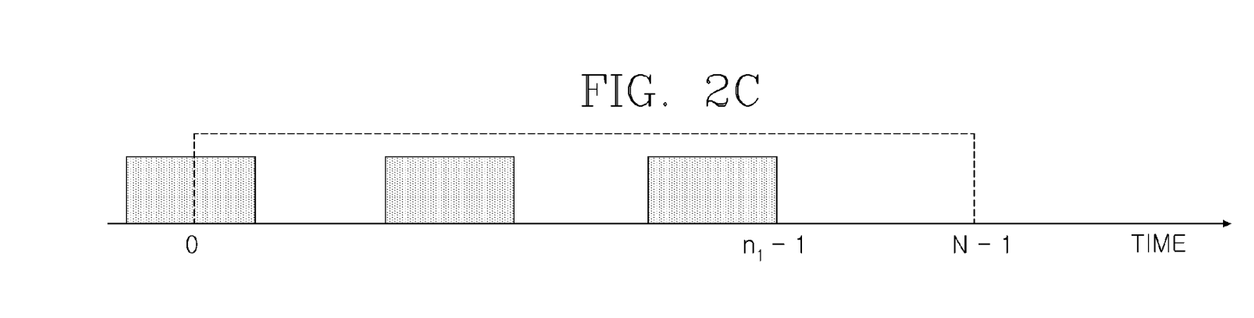

FIGS. 2A, 2B, and 2C illustrate examples of three radar signal reception situations that may occur within an observation window.

Referring to FIGS. 2A, 2B and 2C, one or more radar pulses of the pulse radar signal may appear only in some sections within an observation window between a sample time n=0 and a sample time N−1, which is shown in FIGS. 2A, 2B and 2C. In FIGS. 2A, 2B and 2C, N signal samples within the observation window are observed. In Case I of FIG. 2A, no denotes a time when a radar pulse of the pulse radar signal starts, and the pulse radar signal exists up to n=n₁−1=N−1. M is the period of the radar pulses. In Case III of FIG. 2C, the pulse radar signal exists from $n_0=0$, and $(n_1-1)$ denotes a time when the radar pulse of the pulse radar signal ends. In Case II of FIG. 2B, the pulse radar signal starts from $n_0=0$, and appears up to n=n₁−1=N−1.

In view of the aforementioned, in the present disclosure, the task of detecting a pulse compressed radar signal can be modeled by a hypothesis testing problem, in which the generalized likelihood ratio test can be applied. For example, when calculating the distance to a target by transmitting a radar signal and detecting a reflected radar pulse, an increase in transmission power and a decrease in pulse width are required to achieve a longer detection range and a higher range resolution for a pulse radar, which are difficult to implement in terms of hardware. Here, the radar signal may be converted into a pulse compressed signal by linear frequency modulation (FM), thereby transmitting and receiving the pulse compressed signal. In the present disclosure, when various shapes of pulse radar signals, such as the pulse compressed signal, are used, a pulse width may be extended without increasing an amplitude, making it possible to accurately measure the reception time of a reflected wave and thus to accurately calculate the distance of an object at a long distance. Furthermore, a method of the present disclosure may be applied even to a non-pulse compressed radar signal, thus having a relatively wide application range and attaining excellent detection performance.

When hypothesis $H_0$ is valid, r(n), which is an n-th (0, 1, 2, . . . , N−1) sample value of a received radar signal in a baseband, may be represented by Equation 1. The received radar signal may be a signal with a pulse period of M (see FIGS. 2A, 2B and 2C), and r(n) may be a signal sampled with a period shorter than the pulse period of M. Further, the length N of the observation window may be an integer multiple of M. Here, w(n) denotes an additive white Gaussian noise (AWGN) with a zero mean and a noise power value of $\sigma_w^2$.

$$r(n)=w(n)\ n=0,\ldots,N-1 \quad \text{[Equation 1]}$$

In hypothesis $H_0$, a probability density function $f(r(n)|H_0)$ of sample values {r(n), (n=0, 1, . . . , N−1)} of the received signal may be represented by Equation 2.

$$f(r(n)\mid H_0) = \frac{1}{\pi\sigma_w^2}\exp\left(-\frac{|r(n)|^2}{\sigma_w^2}\right)\ n=0,\ldots,N-1 \quad \text{[Equation 2]}$$

In hypothesis $H_1$, the sample value r(n) of the received signal may be represented by Equation 3. Here, p(n) denotes a pulse radar signal value. p(n) may exist in some section of the observation window, and thus is set to be defined for n=n₀, n₀+1, . . . , n₁−1 to indicate this value.

$$r(n) = \begin{cases} w(n) & n=0,\ldots,n_0-1 \\ p(n)+w(n) & n=n_0,\ldots,n_1-1 \\ w(n) & n=n_1,\ldots,N-1 \end{cases} \quad \text{[Equation 3]}$$

In hypothesis $H_1$, a probability density function $f(r(n)|H_1)$ may be represented by Equation 4.

$$f(r(n)\mid H_1) = \begin{cases} \frac{1}{\pi\sigma_w^2}\exp\left(-\frac{|r(n)|^2}{\sigma_w^2}\right) & n=0,\ldots,n_0-1 \\ \frac{1}{\pi\sigma_w^2}\exp\left(-\frac{|r(n)-p(n)|^2}{\sigma_w^2}\right) & n=n_0,\ldots,n_1-1 \\ \frac{1}{\pi\sigma_w^2}\exp\left(-\frac{|r(n)|^2}{\sigma_w^2}\right) & n=n_1,\ldots,N-1 \end{cases} \quad \text{[Equation 4]}$$

Defining likelihood functions of the respective received signals in hypothesis $H_1$, and hypothesis $H_0$ as $f(r|H_0)$ and $f(r|H_1)$, in a likelihood ratio test (LRT), test statistic T is calculated by Equation 5 and is compared with a threshold value, thereby determining whether there is a radar signal. To apply the LRT, the values of $n_0$, $n_1$, p(n), and $\sigma_w^2$ need to be known in advance.

$$T = \frac{f(r\mid H_1)}{f(r\mid H_0)} \quad \text{[Equation 5]}$$

However, the values of the variables $n_0$, $n_1$, p(n), and $\sigma_w^2$, cannot be known in advance. Therefore, in the present disclosure, the values of the variables $n_0$, $n_1$, p(n), and $\sigma_w^2$ are estimated by maximum likelihood estimation, and new test statistic Γ is calculated by using the estimated values as follows, thereby determining whether there is a radar signal.

Hereinafter, a radar signal detection method according to the present disclosure will be described in detail with reference to a flowchart of FIG. 3.

Figure 3:
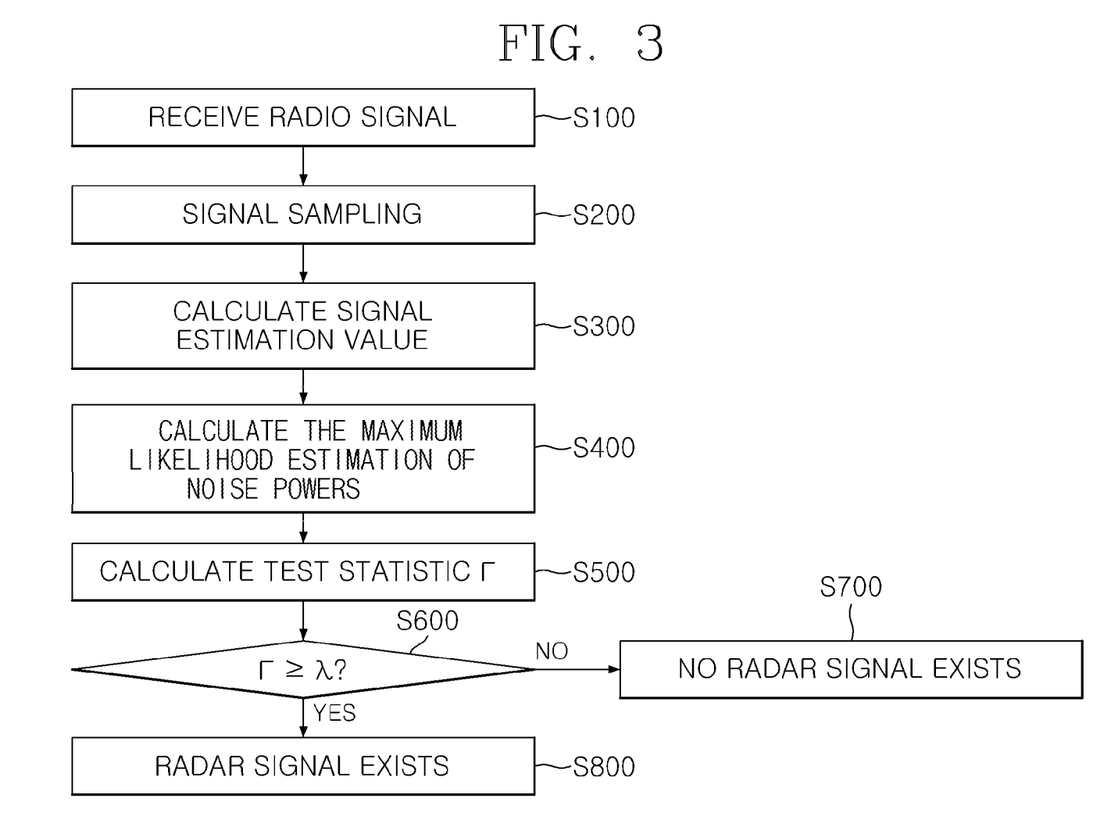
FIG. 3 is a flowchart illustrating a radar signal detection method according to the present disclosure.

FIG. 3 is a flowchart illustrating a radar signal detection method according to the present disclosure.

First, a detection device receives a radio frequency (RF) signal (S100), and performs signal sampling at each time n with a predetermined period in each observation window in a baseband to generate resultant signal sample values {r(n), (n=0, 1, . . . , N−1)} (S200).

Next, the detection device calculates a radar signal estimation value p̂(n) at each time n with respect to the signal sample values r(n) (S300). To use a maximum likelihood estimation (MLE) algorithm for radar signal estimation according to a GLRT, the radar signal estimation value p̂(n) is calculated as below.

The estimation value p̂(n) of a radar signal p(n) (n=n₀, n₀+1, . . . , n₁−1) may be calculated by Equation 6. Since p(n) has a period of M, p(n) where n=n₀, n₀+1, . . . , n₁−1 may be estimated by estimating p(n) where n=n₀, n₀+1, . . . , n₀+K−1 when L=0 and estimating P(n) where n=n₀, n₀+1, . . . , n₀+M−1 when L is 1 or greater. Here, K is the number of radar pulse samples not included in L pulse periods from the time no when the pulse starts.

That is, when L is 1 or greater, p(n) is estimated as follows in Equation 6.

$$\hat{p}(n) = \begin{cases} \dfrac{1}{L+1}\sum_{l=0}^{L} r(n+lM) & n_0 \leq n < n_0 + K \\ \dfrac{1}{L}\sum_{l=0}^{L-1} r(n+lM) & n_0 + K \leq n < n_0 + M \end{cases} \quad \text{[Equation 6]}$$

When L=0, p(n) where n=$n_0$, $n_0$+1, . . . , $n_0$+K−1 is estimated as follows in Equation 7.

$$\hat{p}(n) = r(n) \quad n_0 \leq n < n_0 + K \quad \text{[Equation 7]}$$

Here, $n_0$ denotes a time when the radar pulse of the pulse radar signal starts, ($n_1$−1) denotes a time when the radar pulse of the pulse radar signal ends, $$L = \left\lfloor \frac{n_1 - n_0}{M} \right\rfloor, K = n_1 - n_0 - LM,$$

and $\lfloor x \rfloor$ denote a maximum integer not exceeding x, and M denotes the period of the radar pulses.

The foregoing calculation is due to the radar pulse being repeated with a period of M within each observation window.

For example, when the sample period of r(n) where $n_1$−$n_0$=45($n_0$=5, $n_1$=50) and M=10 is 1, L=4 and K=5 (see FIGS. 2A, 2B and 2C), and in Equation 6, the average of r(n), r(n+M), r(n+4M) where n=5 to 9 is calculated, and the average of r(n), r(n+M), . . . , r(n+3M) where n=10 to 13 is calculated.

Next, the detection device calculates a first maximum likelihood estimation value (MLE) $\hat{\sigma}_{w,0}^2$ of noise power in a noise section of r(n), that is, noise power when no radar pulse exists in the observation window of r(n), and a second maximum likelihood estimation value (MLE) $\hat{\sigma}_{w,1}^2$ of noise power when the pulse radar signal exists in the observation window of r(n) according to Equation 8 to correspond to the estimated radar pulse value $\hat{p}(n)$ (S400). These estimation values correspond to noise power values $\sigma_w^2$ in Equation 2 and Equation 4.

$$\hat{\sigma}_{w,0}^2 = \frac{1}{N}\sum_{n=0}^{N-1} |r(n)|^2 \quad \text{[Equation 8]}$$

$$\hat{\sigma}_{w,1}^2 = \frac{1}{N}\left\{ \sum_{n=0}^{n_0-1} |r(n)|^2 + \sum_{n=n_0}^{n_1-1} |r(n) - \hat{p}(n)|^2 + \sum_{n=n_1}^{N-1} |r(n)|^2 \right\}$$

Here, $n_0$ denotes the time when the radar pulse of the pulse radar signal starts, and ($n_1$−1) denotes the time when the radar pulse of the pulse radar signal ends. The average of squares of differences between the signal sample values r(n) and the estimated radar pulse values $\hat{p}(n)$ is included in $\hat{\sigma}_{w,1}^2$.

The detection device calculates a generalized likelihood ratio test (GLRT)-based test statistic Γ (value at $n_0$ and $n_1$ where the corresponding values are the maximum) by using these estimation values $\hat{p}(n)$, $\hat{\sigma}_{w,0}^2$, and $\hat{\sigma}_{w,1}^2$ according to Equation 9 (S500).

$$\Gamma = \max_{n_0, n_1} \left( \frac{\hat{\sigma}_{w,0}^2}{\hat{\sigma}_{w,1}^2} \right)^N \quad \text{[Equation 9]}$$

Here, when calculating the test statistic Γ, $n_0$ may be estimated as the time when the radar pulse of the pulse radar signal starts, and ($n_1$−1) may be estimated as the time when the radar pulse of the pulse radar signal ends. That is, the GLRT-based test statistic Γ is calculated by applying a likelihood function f(r|$H_0$), in which the first maximum likelihood estimation value $\hat{\sigma}_{w,0}^2$ is applied as $\sigma_w^2$ in f(r(n)|$H_0$) of Equation 2 in the test statistics of Equation 5, and a likelihood function f(r|$H_1$), in which the second maximum likelihood estimation value $\hat{\sigma}_{w,1}^2$ is applied as $\sigma_w^2$ in f(r(n)|$H_1$) of Equation 4. In the present disclosure, the test statistic Γ may be calculated according to Equation 9 and be compared with a threshold value λ, thereby determining whether there is a radar signal.

The detection device may compare the test statistic Γ with the detection threshold value 2, in each observation window (S600), may determine that there is a radar signal when the test statistic Γ is λ or greater (S700), and may determine that there is no radar signal otherwise (S800). The threshold value λ, is a reference value for determining whether there is a radar signal, and may be set to a predetermined value to satisfy a target false alarm rate with reference to an experiment.

In addition, the detection device may determine whether there is a radar signal by integrating test statistics $\Gamma_1, \Gamma_2, \ldots, \Gamma_n$ in n (natural number) observation windows T1, T2, . . . , Tn. For example, for data included in the plurality of observation windows T1, T2, . . . , Tn temporally adjacent, the detection device may add test statistics $\Gamma_1, \Gamma_2, \ldots, \Gamma_n$ in the respective observation windows T1, T2, . . . , Tn and may compare the sum thereof with the detection threshold value, thereby determining whether there is the pulse radar signal in the observation windows. Furthermore, the detection device may compare each of the calculated test statistics $\Gamma_1, \Gamma_2, \ldots, \Gamma_n$ with the detection threshold value, and may determine that there is the pulse radar signal in the observation windows when a predetermined number k or more of test statistics among the n test statistics are greater than the detection threshold value. When there is the pulse radar signal as described above, the detection device may generate final estimation values for the time no when the radar pulse of the pulse radar signal starts and the time $n_1$−1 when the radar pulse of the pulse radar signal ends. That is, in a process of calculating Equation 9, $n_0$ and $n_1$ are estimated.

Hereinafter, the result of deriving the radar pulse detection performance of the radar signal detection method according to the present disclosure through a simulation using a computer will be described. As a simulation environment, a linear frequency modulation (LFM) radar signal with a PRF of 10 kHz, a pulse width of 20 μs, and a sweep bandwidth of 40 kHz is assumed, and the radar signal is assumed to be received through a Rayleigh fading channel. A sampling frequency of 1 MHz is used, and an observation time is set to 0.3 ms. In addition, the start times of the pulse radar signal in the observation window are set to follow a uniform distribution from the start time of the observation window to a time corresponding to the pulse width such that three radar pulses are always included in the observation window. A computer simulation using a Monte Carlo method is used, and is performed 3000 times.

Figure 4:
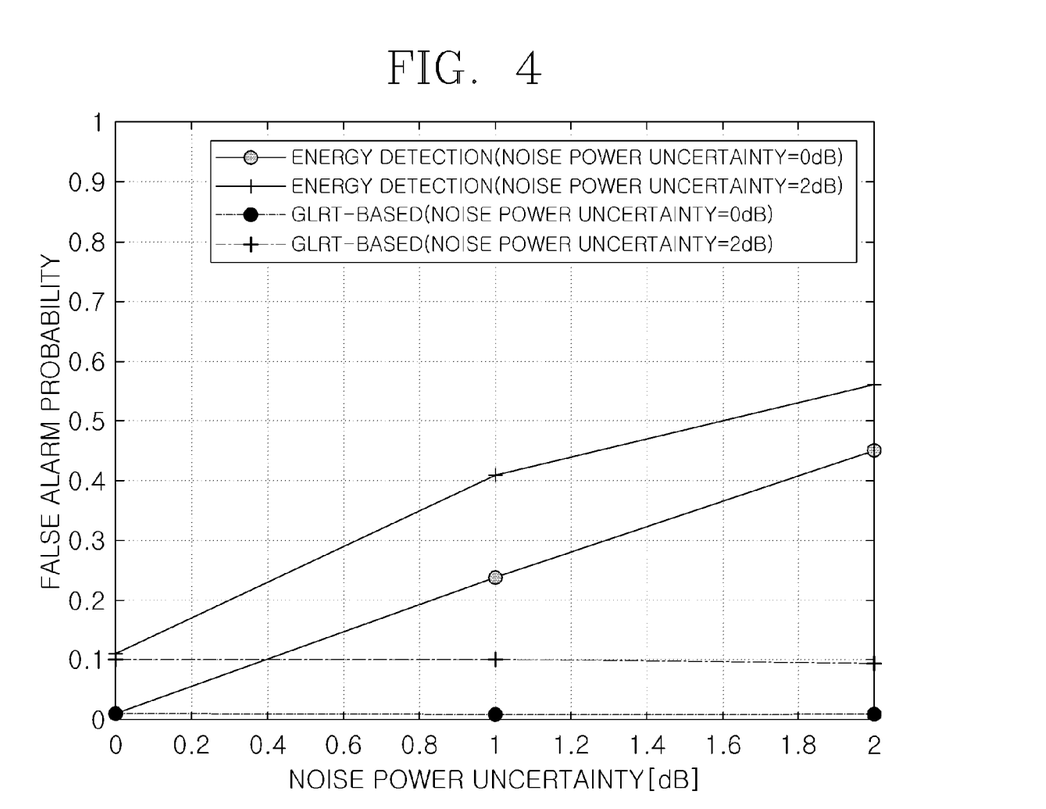
FIG. 4 illustrates an example of simulation results of a false alarm probability according to noise uncertainty in the present disclosure and a conventional art.

FIG. 4 illustrates an example of simulation results of a false alarm probability according to noise uncertainty in the present disclosure and a conventional energy detection method.

FIG. 4 illustrates a change in false alarm probability according to noise power uncertainty in the method of the present disclosure (GLRT-based method) and the conventional energy detection method, in which the method of the present disclosure has an advantage of maintaining a constant false alarm probability (e.g., 0 to 0.1) regardless of noise power uncertainty.

Figure 5:
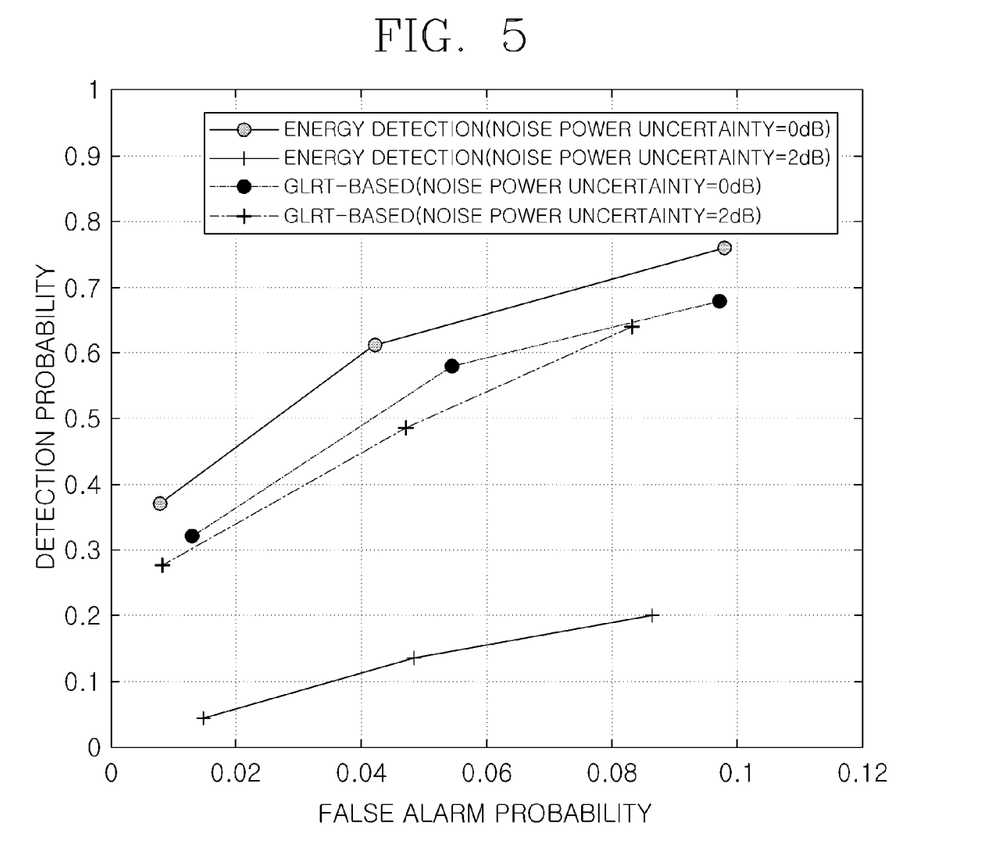
FIG. 5 illustrates an example of simulation results of a detection probability according to a false alarm probability in the present disclosure and the conventional energy detection method when SNR=−5 dB.

FIG. 5 illustrates an example of simulation results of a detection probability according to a false alarm probability in the present disclosure and the conventional energy detection method when SNR=−10 dB.

Figure 6:
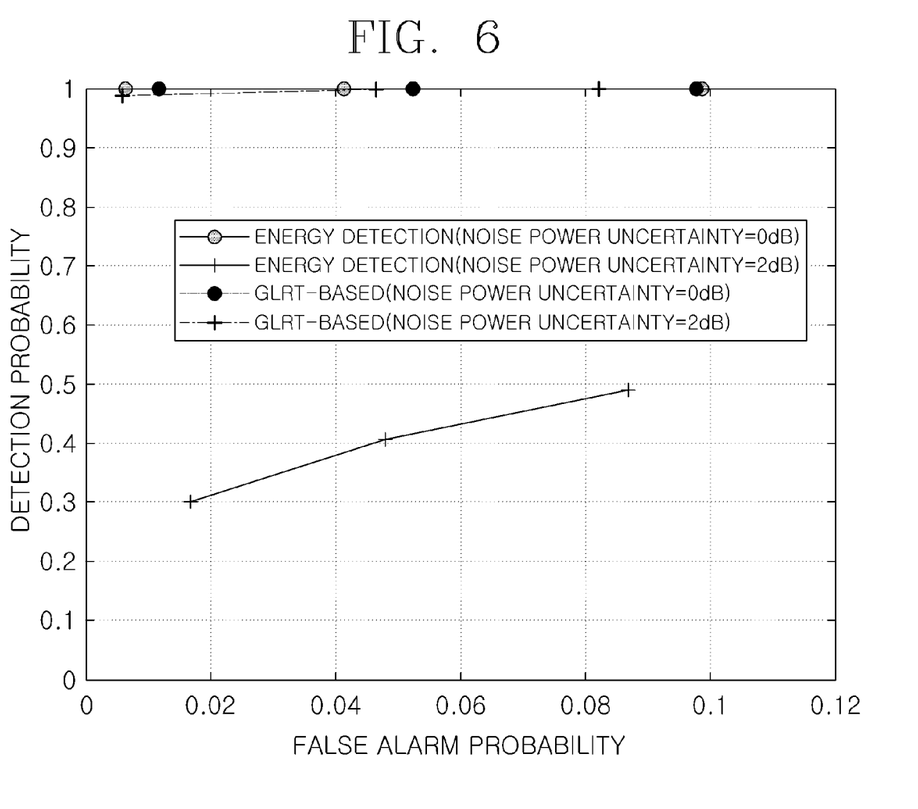
FIG. 6 illustrates an example of simulation results of a detection probability according to a false alarm probability in the present disclosure and the conventional energy detection method when SNR=−0 dB.

FIG. 6 illustrates an example of simulation results of a detection probability according to a false alarm probability in the present disclosure and the conventional energy detection method when SNR=−5 dB.

FIG. 5 and FIG. 6 illustrate a detection probability according to a false alarm probability in the GLRT-based method of the present disclosure and the conventional energy detection method when SNR=−10 dB and SNR=−5 dB. As shown in the drawings, detection performance significantly changes depending on noise power uncertainty in the conventional energy detection method, but does not in the present disclosure. In particular, the detection performance of the present disclosure is maintained higher than that of the conventional energy detection method even when the noise power uncertainty is 2 dB.

As described above, the radar signal detection method according to the present disclosure may detect a pulse compressed radar signal on the basis of a generalized likelihood ratio test (GLRT) by adequately utilizing the repeatability of pulses, and may be applied even to a non-pulse compressed radar signal, thus having a relatively wide application range and securing excellent detection performance.

The foregoing detection device for detecting a radar signal according to the present disclosure may be configured as hardware, software, or a combination thereof. For example, the detection device may be configured as a computing system having at least one processor to perform the foregoing functions. The computing system may include the at least one processor, a memory, a user interface input device, a user interface output device, a storage, and a network interface connected via a bus. The processor may be a central processing unit (CPU) or a semiconductor device to execute processing of instructions stored in the memory and/or the storage. The memory and the storage may include various types of volatile or nonvolatile storage media. For example, the memory may include a read only memory (ROM) and a random access memory (RAM).

Accordingly, operations of the method or algorithm described in relation to the embodiments disclosed herein may be directly implemented by hardware, a software module, or a combination of the two executed by the processor. The software module may reside in a storage medium (i.e., the memory and/or the storage), such as the RAM, a flash memory, the ROM, an EPROM, an EEPROM, a register, a hard disk, a removable disk, and a CD-ROM. The illustrative storage medium may be coupled to the processor, and the processor may read information from the storage medium and may write information in the storage medium. Alternatively, the storage medium may be integrated with the processor. The processor and the storage medium may reside in an application-specific integrated circuit (ASIC). The ASIC may reside in a user terminal. Alternatively, the processor and the storage medium may reside as separate components in a user terminal. Accordingly, the detection device according to an embodiment of the present disclosure may be configured to perform the radar signal detection method, the functions, or the algorithm by a computer program stored in the medium in combination with the hardware.

For example, the detection device of the present disclosure may be configured to include a computing device including a processor and a memory coupled to the processor. The memory may include one or more modules configured to include an instruction to be executed by the processor. For example, the processor may control an operation of the modules to perform, by the instruction, an operation of sampling signal sample values {r(n), (n=0, 1, . . . , N−1)} in each observation window by receiving an RF signal and performing signal sampling at each time (n), an operation of calculating a signal estimation value $\hat{p}(n)$ at each time (n) with respect to the signal sample values r(n), an operation of calculating a first maximum likelihood estimation value $\hat{\sigma}_{w,0}^2$ of noise power when no radar pulse exists in the observation window of r(n) and a second maximum likelihood estimation value $\hat{\sigma}_{w,1}^2$ of noise power when the radar pulse exists in the observation window of r(n), and an operation of determining whether a radar signal exists in the observation window by calculating a test statistic $\Gamma$ in each observation window by using $\hat{\sigma}_{w,0}^2$ and $\hat{\sigma}_{w,1}^2$ and comparing the test statistic $\Gamma$ with a detection threshold value.

As described above, the present disclosure has been described with reference to specific details, such as specific components, limited embodiments, and drawings, which are provided only to help a more general understanding of the present disclosure. The present disclosure is not limited to the above embodiments, and various modifications and changes will be possible by those of ordinary skill in the field to which the present disclosure pertains without departing from the essential characteristics of the present disclosure. Therefore, the spirit of the present disclosure should not be limited to the described embodiments, and the claims described below and equivalents or equivalent modifications to these claims should be construed as being included in the scope of the present disclosure.

What is claimed is:

1. A radar signal detection method by a detection device, the method comprising:
    sampling signal sample values {r(n), (n=0, 1, . . . , N−1)} in each observation window by receiving an RF signal and performing signal sampling at each time (n);
    calculating a signal estimation value $\hat{p}(n)$ at each time (n) with respect to the signal sample values r(n);
    calculating a first maximum likelihood estimation value $\hat{\sigma}_{w,0}^2$ of noise power when no radar pulse exists in the observation window of r(n) and a second maximum likelihood estimation value $\hat{\sigma}_{w,1}^2$ of noise power when the radar pulse exists in the observation window of r(n); and
    determining whether a radar pulse exists in the observation window by calculating a test statistic $\Gamma$ in each observation window by using $\hat{\sigma}_{w,0}^2$ and $\hat{\sigma}_{w,1}^2$ and comparing the test statistic $\Gamma$ with a detection threshold value.

2. The radar signal detection method of claim 1, wherein the determining whether the radar pulse exists in the observation window comprises generating a final estimation value for a time $(n_0)$ at which the radar pulse of a pulse radar signal starts and a time $(n_1-1)$ at which the radar pulse of the pulse radar signal ends when one or more radar pulses exist in the pulse radar signal.

3. The radar signal detection method of claim 1, further comprising:

determining whether a radar signal exists in a plurality of observation window by comparing a total test statistic obtained by adding test statistics ($\Gamma_1, \Gamma_2, \ldots, \Gamma_n$) in the respective observation windows during the n (natural number) observation windows with a predetermine period with the detection threshold value.

4. The radar signal detection method of claim 1, further comprising:
determining whether a radar signal exists in a plurality of observation window according to whether a predetermined number k or more of test statistics among test statistics ($\Gamma_1, \Gamma_2, \ldots, \Gamma_n$) in the respective observation windows during the n (natural number) observation windows with a predetermined period are greater than the detection threshold value.

5. The radar signal detection method of claim 1, wherein the signal estimation value $\hat{p}(n)$ is calculated by the following equation:

$$\hat{p}(n) = \begin{cases} \dfrac{1}{L+1}\sum_{l=0}^{L} r(n+lM) & n_0 \leq n < n_0 + K \\ \dfrac{1}{L}\sum_{l=0}^{L-1} r(n+lM) & n_0 + K \leq n < n_0 + M \end{cases}$$

when L is 1 or greater, and
is calculated by the following equation:

$$\hat{p}(n) = r(n) \quad n_0 \leq n < n_0 + K$$

when L is 0,
where $n_0$ denotes a time when the radar pulse of a pulse radar signal starts, ($n_1-1$) denotes a time when the radar pulse of the pulse radar signal ends, $$L = \left\lfloor \frac{n_1 - n_0}{M} \right\rfloor, K = n_1 - n_0 - LM,$$

and $\lfloor x \rfloor$ denote a maximum integer not exceeding x, and M denotes a period of the radar pulses.

6. The radar signal detection method of claim 1, wherein the first maximum likelihood estimation value $\hat{\sigma}_{w,0}^2$ and the second maximum likelihood estimation value $\hat{\sigma}_{w,1}^2$ are calculated by the following equations:

$$\hat{\sigma}_{w,0}^2 = \frac{1}{N} \sum_{n=0}^{N-1} |r(n)|^2$$

$$\hat{\sigma}_{w,1}^2 = \frac{1}{N} \left\{ \sum_{n=0}^{n_0-1} |r(n)|^2 + \sum_{n=n_0}^{n_1-1} |r(n) - \hat{p}(n)|^2 + \sum_{n=n_1}^{N-1} |r(n)|^2 \right\},$$

where $n_0$ denotes a time when the radar pulse of a pulse radar signal starts, and ($n_1-1$) denotes a time when the radar pulse of the pulse radar signal ends.

7. The radar signal detection method of claim 1, wherein the test statistic $\Gamma$ is calculated by the following equation:

$$\Gamma = \max_{n_0, n_1} \left( \frac{\hat{\sigma}_{w,0}^2}{\hat{\sigma}_{w,1}^2} \right)^N,$$

where $n_0$ denotes a time when the radar pulse of a pulse radar signal starts, and ($n_1-1$) denotes a time when the radar pulse of the pulse radar signal ends.

* * * * *